United States Patent
Nguyen

(10) Patent No.: US 6,816,354 B2
(45) Date of Patent: Nov. 9, 2004

(54) SINGLE LAYER CAPACITOR MILLED PART

(75) Inventor: Huong K. Nguyen, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 10/186,279

(22) Filed: Jun. 27, 2002

(65) Prior Publication Data

US 2003/0016485 A1 Jan. 23, 2003

Related U.S. Application Data

(60) Provisional application No. 60/302,546, filed on Jul. 2, 2001.

(51) Int. Cl.$^7$ ............................................... H01G 4/228
(52) U.S. Cl. ................. 361/306.3; 361/306.1; 361/34.1; 361/34.5; 361/311; 361/313
(58) Field of Search ........................... 361/306.1, 306.3, 361/321.1, 321.4, 321.5, 301.4, 311, 312, 313, 318, 320, 328, 433, 321, 323, 304, 305

(56) References Cited

FOREIGN PATENT DOCUMENTS

| JP | 6251622 A | 9/1994 |
|----|-----------|--------|
| JP | 7014748 A | 1/1995 |

OTHER PUBLICATIONS

U.K. Search Report dated Jan. 10, 2003.

*Primary Examiner*—Anthony Dinkins
*Assistant Examiner*—Nguyen T. Ha
(74) *Attorney, Agent, or Firm*—Dority & Manning, P.A.

(57) ABSTRACT

A single layer capacitive device and a method of making the same are provided. Such method allows for perfect registration between the capacitive plates thus eliminating any significant amount of fringe capacitance and assuring a uniform fringe border around the device. Such a border ensures ease of handling and such method allows for a controlled border in a range of from about 0.5 mils to about 2.0 mils wide. Further, such a method allows for the manufacture of single layer capacitive arrays comprising numerous individual capacitive devices with similar perfect registration and uniform fringe borders. Such devices allow for improved volumetric efficiencies and reduced fringe capacitance, thus offering higher capacitor values in a smaller package size due to greater control during finishing processes.

13 Claims, 3 Drawing Sheets

SINGLE LAYER CAPACITOR MILLED PART

PRIORITY CLAIM

This application claims the benefit of previously filed U.S. Provisional Patent Application entitled "SINGLE LAYER CAPACITY MILLED PART" with the same inventor as present, assigned U.S. Ser. No. 60/302,546, filed on Jul. 2, 2001, and which is incorporated herein by reference.

BACKGROUND OF THE INVENTION

The present subject matter generally relates to a method for manufacturing improved milled single layer capacitors and the single layer capacitors themselves. More specifically, the present subject matter relates to a device and a method of manufacturing such a device in which perfect registration between the capacitor plates within a capacitor is assured. In the same context, the present subject matter relates most directly to a device and a method for making such a device in which perfect registration of the capacitor plates in a single layer capacitor is assured using a tumbling process.

With the ever-increasing demand for additional features and the expectations of longer battery life in present day electronic devices, circuit and component designers have responded with smaller component designs requiring less voltage. The result has been not only an increase in device operation speed or operating frequency, but also an increase in package density. In addition to integrated circuitry, the use of multilayered printed circuits has aided in reducing the space requirements of advanced circuitry for portable electronic devices.

Some designers, however, have continued to look for more straightforward approaches to the problem of reducing the space demands and power-hungry reputations of some of today's component designs. They have continued to try to optimize the performance characteristics of the components themselves even while the devices are shrinking in size. The present subject matter corresponds to such an improved single layer capacitor and a method of improving its performance characteristics.

Component manufacturers often utilize abrasive chemicals, vibrations, ultrasonics, thermal exposure and even manual techniques to "clean" their manufactured parts of the residuals of the manufacturing processes. For example, often times metals used for the terminations are exposed to chemical treatments to remove any oxidation that has built up during the pressing and sintering process. After dicing, components are often subjected to thermal treatments or Harperizing to remove burrs, which may hinder both the proper handling and installation of the components. Harperizing is a process in which the components are tumbled in a barrel with an aqueous abrasive media.

While useful for their purpose, these processes fail to address in any substantive way the idea of improving the performance characteristics of the underlying electronic component. Such processes also fail to provide a reliable mechanism to control the size of the component when the processes are completed. It is, therefore, desirable to provide an improved method for ensuring both perfect registration of the capacitor plates and a given size are obtained in a single layer capacitor utilizing a tumbling process in which the performance characteristics are improved.

SUMMARY OF THE INVENTION

The present subject matter recognizes and addresses various of the foregoing limitations and drawbacks, and others, concerning post-manufacturing processes for removing non-operational manufacturing residuals from an electronic component. Therefore, the presently disclosed technology provides for a device and method for making such a device in which perfect registration of the capacitor plates in a single layer capacitor is assured utilizing a tumbling process.

In accordance with the present technology, use herein of the term "perfect registration" corresponds to substantially complete alignment of capacitor plates. Insubstantial differences in plate registration as recognized by engineering tolerance levels may still exist in some embodiments of the present subject matter while still falling within the spirit and scope of the disclosed technology. Similarly, reference to elimination of fringe capacitance and fringe borders corresponds to substantially complete elimination of such undesirable performance characteristics as within negligible tolerance discrepancies.

It is, therefore, a principle object of the subject technology to provide a single layer capacitor element and a method of manufacturing such a capacitor. More specifically, it is an object of the present technology to provide an improved single layer capacitor and a method for making the same in which the fringe capacitance and fringe borders no longer introduce either functional or handling/mounting problems. In the same context, it is yet another principle object of the present technology to provide an improved single layer capacitor and a method of making the same in which the capacitor is square.

It is an additional principle object of the present subject matter to provide a ceramic capacitive device with gold terminations and a method of making the same in which there exists perfect registration between the electrode plates. In such context, it is still another aspect of the present subject matter to provide a ceramic capacitive device and a method of making the same in which the fringe capacitance and the fringe border introduce no functional or handling/mounting problems.

It is still another principle object of the present subject matter to provide a single layer capacitive array and a method of making the same in which there exists perfect registration between the electrode plates. More specifically, it is a principle object of the presently disclosed technology to provide a ceramic single layer capacitive array with gold termination and a method of making the same in which there exists improved performance characteristics due to a post-formation process.

Additional objects and advantages of the disclosed technology are set forth in, or will be apparent to those of ordinary skill in the art from, the detailed description as follows. Also, it should be further appreciated that modifications and variations to the specifically illustrated and discussed features and materials hereof may be practiced in various embodiments and uses of this technology without departing from the spirit and scope thereof, by virtue of present reference thereto. Such variations may include, but are not limited to, substitutions of the equivalent means, features, and materials for those shown or discussed, and the functional or positional reversal of various parts, steps, features, or the like.

Still further, it is to be understood that different embodiments, as well as different presently preferred embodiments, of this technology may include various combinations or configurations of presently disclosed method steps, features, elements, or their equivalents (including combinations of method steps, features or configurations thereof not expressly shown in the figures or stated in the detailed description).

These and other steps, features, aspects and advantages of the present subject matter will become better understood with reference to the following description and appended claims. The accompanying drawings, which are incorporated in and constitute a part of this specification, illustrate at least one embodiment of the present subject matter and, together with the description, serve to explain the principles of the disclosed technology. In one exemplary embodiment, a single layer capacitor template is formed by sputtering a single layer of fired ceramic over an entire surface with gold terminations as would be known by one of ordinary skill in the art. The template is then diced into individual single layer capacitive devices of a desired size and shape. The single layer capacitive devices are then tumbled to remove all edges and corners thus leaving a uniform border around the entire part.

Such a manufacturing process results in a capacitive device in which the terminations are in perfect registration and there exists no fringe capacitance or significant border problem. Further, the tumbling process inflicts less damage to the components than typical "cleaning methods", including conventional Harperizing. The result is a "cleaner" part and control of the fringe border. In particular, the fringe border is controllable from about 0.5 mils to about 2.0 mils (about 0.0005 to 0.0020 inches). Finally, the improved registration results in an improved volumetric efficiency of the component.

In an alternative exemplary embodiment of the present subject matter, a square single layer capacitor template is formed as above with terminations. The template is then diced into individual single layer capacitive devices of a desired size. These devices are then tumbled to remove all edges and corners thus leaving a uniform border around the entire part. As before the capacitive device has improved performance characteristics similar to those specified above.

In yet another alternative exemplary embodiment of the presently disclosed technology, a single layer capacitive template is formed as above with terminations. The template is diced into a single layer capacitive array of a desired size and shape. These devices are then tumbled to remove all edges and corners thus leaving a uniform border around and between the individual capacitors within the array.

Such a process results in a capacitive array in which the terminations of each of the individual capacitors are in perfect registration and there exists no fringe capacitance or significant border problem. Further, the tumbling process inflicts less damage to the components than typical "cleaning methods", including conventional Harperizing. The result is a "cleaner" part and control of the fringe border. In particular, the fringe border is controllable from about 0.5 mils to about 2.0 mils (about 0.0005 to 0.0020 inches). Finally, the improved registration results in an improved volumetric efficiency of the component and the rounded edges allow for greater adhesion to the epoxy used to mount the component array.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
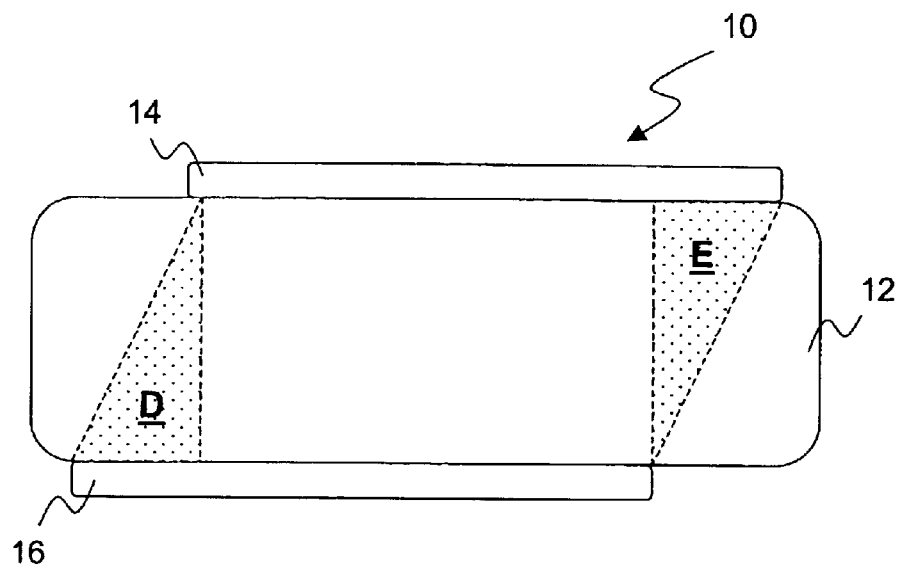
FIG. 1 is a cross-sectional side view of a single layer capacitive device with imperfect registration between electrode plates as may potentially occur utilizing known single layer capacitor technologies.

Repeat use of reference characters throughout the present specification and appended drawings is intended to represent the same or analogous features or elements of the technology.

DETAILED DESCRIPTION OF THE PREFERRED EMBODIMENTS

Reference will now be made in detail to presently preferred embodiments of the disclosed subject matter, examples of which are fully represented in the accompanying drawings. Such examples are provided by way of an explanation of the technology, not limitation thereof. In fact, it will be apparent to those skilled in the art that various modifications and variations can be made in the present subject matter, without departing from the spirit and scope thereof. For instance, features illustrated or described as part of one embodiment can be used on another embodiment to yield a still further embodiment. Still further variations in selection of materials and/or characteristics may be practiced, to satisfy particular desired user criteria. Thus, it is intended that the present technology covers such modifications and variations as come within the scope of the present features and their equivalents.

The present technology is particularly concerned with a single layer capacitive device 10 and a method of making the same. With reference to FIG. 1 and as would be known to one of ordinary skill in the art, sputtering a layer of fired ceramic 12 begins the process of making a device template. The electrode plates 14 and 16 are applied in any of the known methods and the template is then pressed and sintered to obtain a unitary body device template. An exemplary substance for forming electrode plates 14 and 16 corresponds to gold or a suitable alloy including gold. The template is then diced into a desired size and shape to obtain a single layer capacitor 10, or plurality thereof. Upon dicing, however, electrode plates 14 and 16 may not be properly aligned so as to maximize potential capacitance of the device. With capacitor plates 14 and 16 respectively aligned as displayed in FIG. 1, the volumetric efficiency of device 10 is reduced according to areas D and E and yielding undesirable fringe capacitance.

Figure 2:
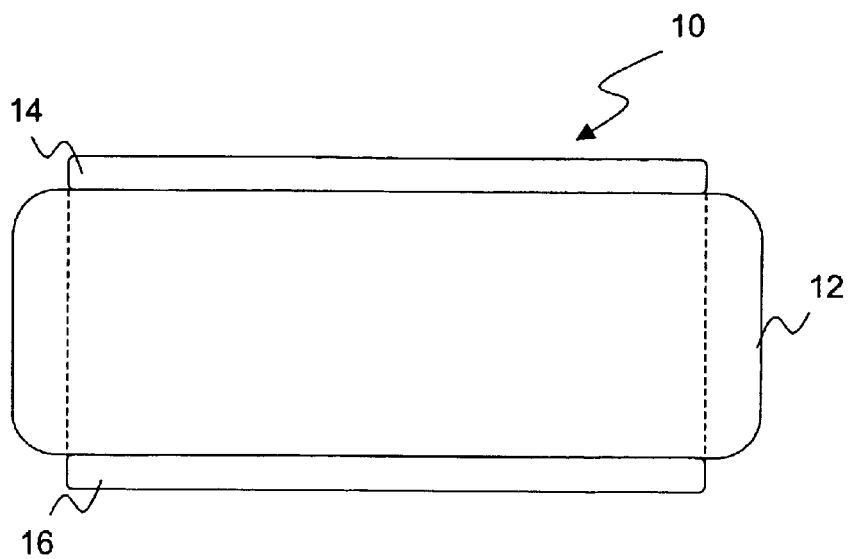
FIG. 2 is a cross-sectional side view of a single layer capacitive device with perfect registration between electrode plates as may be achievable utilizing aspects of the presently disclosed technology.

A more preferable capacitor configuration with improved volumetric efficiency is displayed in FIG. 2. A device 10 as shown in FIG. 2 is characterized by perfect registration between electrode plates 14 and 16, and may be achievable by employing aspects of the presently disclosed technology.

Figure 4:
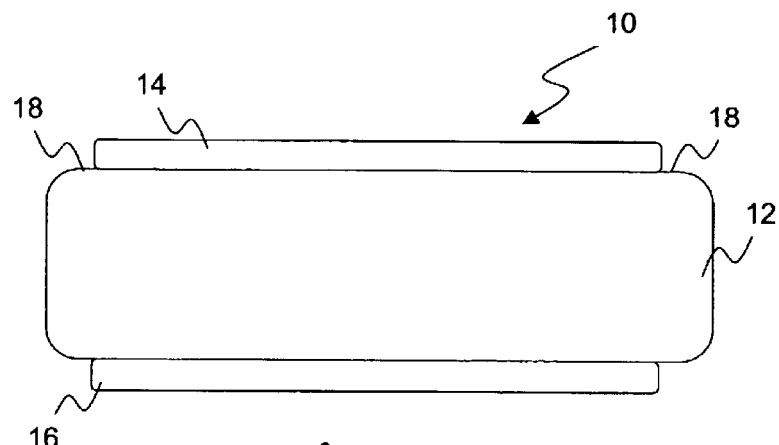
FIG. 4 is a cross-sectional side view of the single layer capacitive device of FIG. 3 taken along line A—A.

In accordance with the present subject matter, a capacitor device 10 can be tumbled to remove unwanted edges and corners of the device. The tumbling process, in addition to removing all of the edges and corners, creates a capacitor 10 with perfect registration between the terminations 14 and 16. Such a device is shown in FIG. 4. This results in substantially eliminating any fringe capacitance (as would occur in sections D and E of the dielectric ceramic 12 as shown in FIG. 1) and a corresponding increase in the volumetric efficiency of the capacitor. Additionally, the tumbling process is gentler than conventional Harperizing or polishing of the component parts resulting in fewer damaged and overall "cleaner" parts. It should be noted that after tumbling, the capacitor 10 no longer suffers from improper registration between the electrode plates 14 and 16 and thus the device of FIG. 4 has no sections D or E between electrode plates/terminations 14 and 16 representing the location in which fringe capacitance would occur. This results in a larger effective area in the capacitor 10 and thus a greater capacitive yield (i.e., a higher capacitive value in the same size component).

Figure 3:
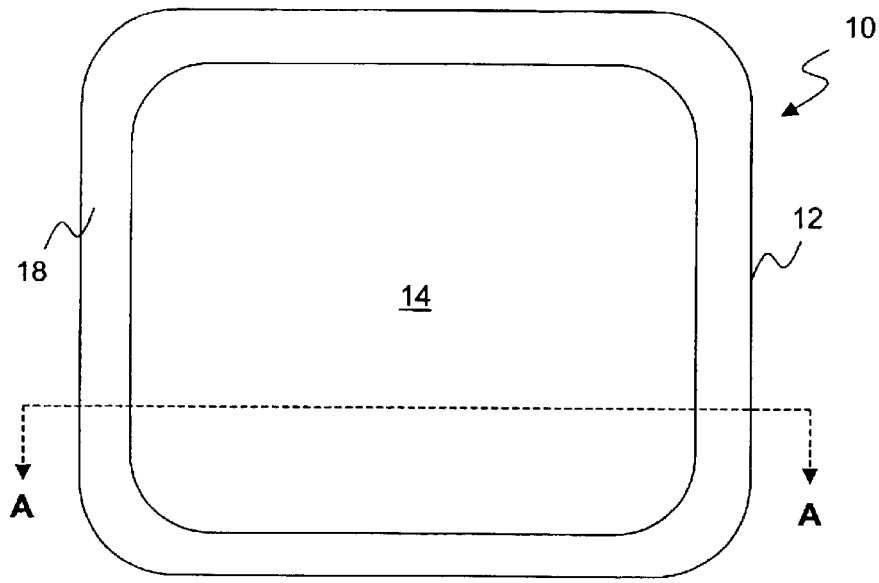
FIG. 3 is an overhead view of a single layer capacitive device in accordance with the present subject matter.

FIG. 3 depicts an overhead representation of a single layer capacitive device 10 in accordance with the present technology. It is important to note that the tumbling process results in a uniform fringe border 18 around the entire device 10. In fact, tumbling the device provides the manufacturer control over the size of the border 18 from about 0.5 mils (0.0005 inches) to about 2.0 mils (0.0020 inches). The use of a square shape further allows for increased handling efficiencies. Such a shape allows for any orientation of the device 10 during manufacturing, packaging, shipment and during placement of the component 10 within a circuit. Additionally, the rounded edges provide a greater contact area for the epoxy typically used to attach the component 10 to the circuit board on which it is to be used.

Figure 5A:
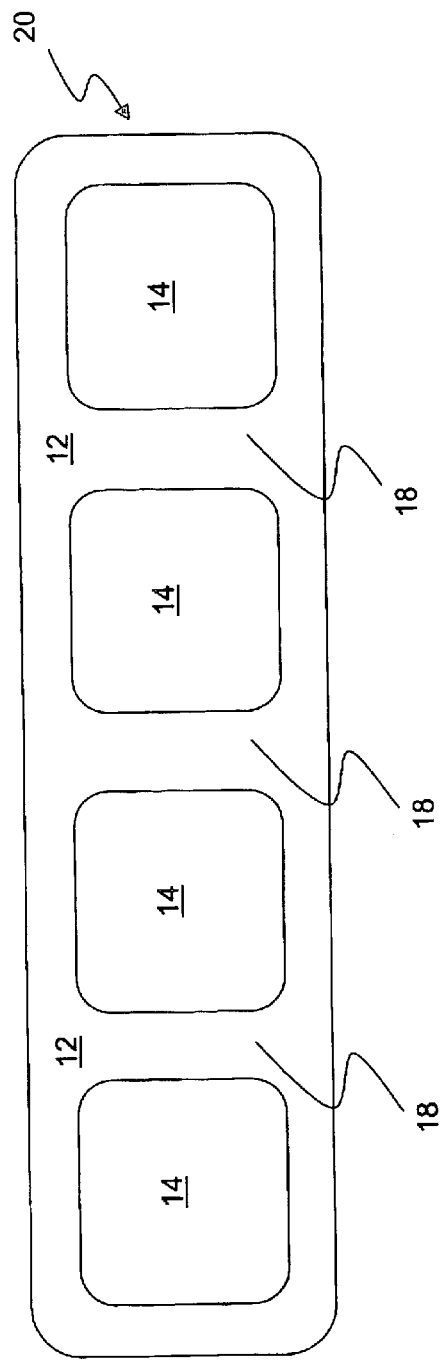
FIG. 5a is an overhead view of a single layer capacitive array in accordance with the present subject matter.
Figure 5B:
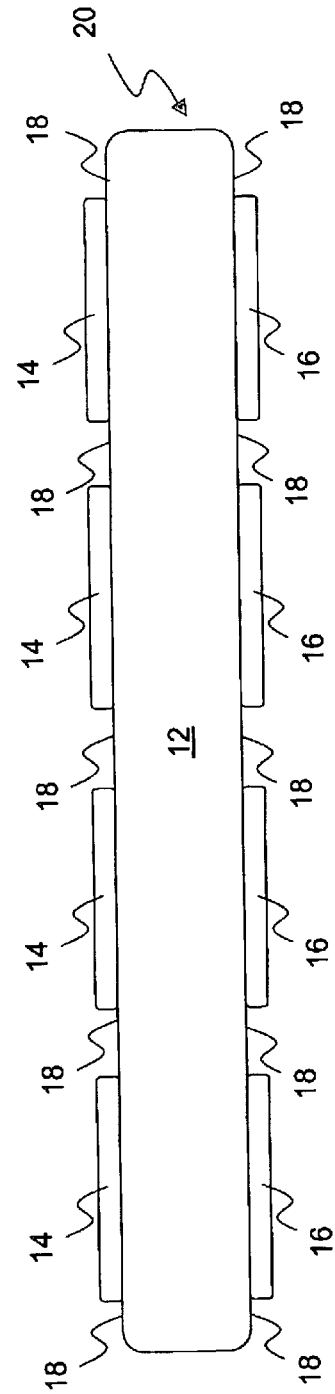
FIG. 5b is a side view of a single layer capacitive array in accordance with the present subject matter.

FIGS. 5a and 5b represent respective overhead and side cross-sectional views of an alternatively preferred device embodiment 20 of the present subject matter. In such figures, a single layer capacitive array 20 is shown with perfect registration between the electrode plates 14 and 16 of each separate capacitor and a uniform fringe border 18 both around and between the individual capacitive cells. Each of the capacitive cells of the array 20, have improved performance characteristics as described above. Each cell lacks any significant amount of fringe capacitance and thus provides a higher capacitive yield and increased volumetric efficiency. Additionally, such an increase in efficiency allows for a smaller overall footprint for the device 10, thus providing a needed solution to the space race on today's circuit boards.

Although exemplary embodiments of the present subject matter have been described using specific terms and devices, such description is for illustrative purposes only. The words used are words of description rather than of limitation. It is to be understood that changes and variations may be made by those of ordinary skill in the art without departing from the spirit or the scope of the present technology, which is set forth in the following claims. In addition, it should be understood that aspects of various other embodiments may be interchanged both in whole or in part. Therefore, the spirit and scope of the appended claims should not be limited to the description of the preferred version contained herein.

What is claimed is:

1. A single layer capacitor, comprising:
   a body of ceramic material;
   a first termination plate provided adjacent to a selected side of said body of ceramic material; and
   a second termination plate provided on the side of said body of ceramic material that opposes said first termination plate, thus forming a stacked configuration with a ceramic layer and two termination layers;
   wherein said first and second termination plates are in substantially complete alignment, thus eliminating any significant amount of fringe capacitance of the single layer capacitor.

2. A single layer capacitor as in claim 1, wherein said first and second termination plates comprise gold.

3. A single layer capacitor as in claim 1, wherein each layer in the stacked configuration formed by said ceramic layer and said first and second termination plates are substantially square.

4. A single layer capacitor as in claim 3, wherein said first and second square termination plates each have a smaller surface area than the area of the respective surface of the body of ceramic material on which it is provided, and wherein said first and second termination plates are each positioned on respective surfaces of the body of ceramic material such that a uniform border of ceramic material around each termination plate is exposed.

5. A single layer capacitor as in claim 4, wherein the width of the uniform borders around each said termination plate is controllable in a range of from about 0.5 mils to about 2.0 mils.

6. A single layer capacitor as in claim 1, wherein said stacked configuration forming said single layer capacitor has rounded corners, whereby adhesion of the single layer capacitor to a mounting surface is facilitated.

7. A single layer capacitor array, comprising:
   a body of ceramic material;
   a plurality of first termination plates provided on a selected side of said body of ceramic material; and
   a plurality of second termination plates provided on the side of said body of ceramic material that opposes said plurality of first termination plates, wherein each second termination plate opposes a respective first termination plate thus forming a plurality of capacitive cells within said single layer capacitor array;
   wherein each opposing set of first and second termination plates are in substantially complete alignment, thus eliminating any significant amount of fringe capacitance for each capacitive cell in the single layer capacitor array.

8. A single layer capacitor array as in claim 7, wherein each said first and second termination plate comprises gold.

9. A single layer capacitor array as in claim 7, wherein each said first and second termination plate is substantially square in shape.

10. A single layer capacitor array as in claim 9, wherein each first and second square termination plate is formed with slightly rounded corners such that adhesion of each termination to a mounting surface is facilitated.

11. A single layer capacitor array as in claim 7, wherein said first and second termination plates are each positioned on respective surfaces of the body of ceramic material such that a uniform border around each termination plate is formed.

12. A single layer capacitor array as in claim 11, wherein the width of the uniform borders around each said termination plate is controllable in a range of from about 0.5 mils to about 2.0 mils.

13. A single layer capacitor array as in claim 7, wherein the capacitive cells within the single layer capacitor array are configured in a generally linear fashion forming an n-by-one array of capacitive cells, where n is a selected positive integer.

* * * * *

UNITED STATES PATENT AND TRADEMARK OFFICE
CERTIFICATE OF CORRECTION

PATENT NO.        : 6,816,354 B2
APPLICATION NO. : 10/186279
DATED             : November 9, 2004
INVENTOR(S)       : Nguyen It is certified that error appears in the above-identified patent and that said Letters Patent is hereby corrected as shown below:

On title page Item (56) please add:

References Cited

U.S. PATENT DOCUMENTS

| | | | |
|---|---|---|---|
| 6,058,004 | 05/2000 | Duva et al. | 361/301.4 |
| 5,933,318 | 08/1999 | Tomono et al. | 361/323 |
| 5,172,304 | 12/1992 | Ozawa et al. | 361/763 |
| 4,312,026 | 01/1982 | Iwaya et al. | 361/321.1 |

Signed and Sealed this

Seventh Day of August, 2007

JON W. DUDAS
*Director of the United States Patent and Trademark Office*